US007739732B2

(12) United States Patent
Camilli

(10) Patent No.: US 7,739,732 B2
(45) Date of Patent: Jun. 15, 2010

(54) GRAPHICAL USER INTERFACE THAT PERMITS THE SELECTION OF A SECURITY SETTING TO CONTROL ACCESS TO A REMOVABLE STORAGE DEVICE

(75) Inventor: Anthony M. Camilli, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1203 days.

(21) Appl. No.: 11/231,680

(22) Filed: Sep. 21, 2005

(65) Prior Publication Data

US 2006/0070123 A1    Mar. 30, 2006

Related U.S. Application Data

(60) Provisional application No. 60/613,521, filed on Sep. 27, 2004.

(51) Int. Cl.
*G06F 13/00* (2006.01)
(52) U.S. Cl. ........................................ 726/16; 711/115
(58) Field of Classification Search .................. 726/16; 711/115, 163
See application file for complete search history.

(56) References Cited

U.S. PATENT DOCUMENTS 6,044,475 A * 3/2000 Chung et al. .................. 714/15

2001/0003041 A1 * 6/2001 Redford et al. ......... 434/307 R

OTHER PUBLICATIONS

Microsoft. "How to: Disable the Use of USB Storage." Aug. 19, 2003. Available at http://web.archive.org/web/20050210225652/http://support.microsoft.com/kb/823732/en-us. Downloaded Nov. 13, 2008.*
Andersen, S., et al., "Microsoft in view of Changes to Functionality in Microsoft Windows XP Service Pack 2, Part 7." Sep. 15, 2004. Available at http://technet.microsoft.com/en-us/library/bb457157(printer).aspx. Downloaded Nov. 13, 2008.*
Bragg, R., "8 Ways to Protect USB Usage." Oct. 2004. Available at http://redmondmag.com/columns/print.asp?EditorialsID=811. Downloaded Nov. 13, 2008.*
Microsoft. "Backing Up and Restoring the Registry" Mar. 28, 2003. Available at http://technet.microsoft.com/en-us/library/cc758453(printer).aspx. Downloaded Nov. 17, 2008.*
Karp, David A, Troy Mott, and Tim O'Reilly. Windows XP in a Nutshell. Sebastopol: O'Reilly Media, 2002. Print.*

(Continued)

*Primary Examiner*—Nasser Moazzami
*Assistant Examiner*—Travis Pogmore

(57) ABSTRACT

A system comprises a processor, a display, an operating system executable on the processor and an executable application that is separate from the operating system. The operating system provides settings that can be used to control access to a removable storage medium. The application provides a graphical user interface (GUI) that permits a user to select a security setting from among a plurality of selectable security settings and that causes the operating system to implement the user-selected security settings to control access to the removable storage medium.

9 Claims, 2 Drawing Sheets

OTHER PUBLICATIONS

Burge, et al. "Unable to eject USB flash drive." Computer Tech Support Forum—Windows—Linux—Mac—Computing.Net. N.p., Jun. 2004. Available at http://www.computing.net/answers/windows-2000/unable-to-eject-usb-flash-drive/58411.html. Downloaded Dec. 3, 2009.*

"How can I mark my USB storage devices as read-only?" WindowsITPro, Nov. 5, 2004, 3 pp. [Online] http://www.windowsitpro.com/Article/ArticleID/44380/44380.html.

"Thread: Disable USB ports to prevent unauthorized data transfers," Copyright 2005 CNET Networks, Inc., 7 pp.; [Online] http://techrepublic.com.com/5208-6247-0.html?forumID=12&threadID=116436&messaaeID=1678065.

"How to disable the use of USB storage devices," Copyright 2005 Microsoft Corporation, 2 pp. [Online] http://support.microsoft.com/default.aspx?scid=kb;en-us;823732.

* cited by examiner

GRAPHICAL USER INTERFACE THAT PERMITS THE SELECTION OF A SECURITY SETTING TO CONTROL ACCESS TO A REMOVABLE STORAGE DEVICE

CROSS-REFERENCE TO A RELATED APPLICATION

The present application claims the benefit of, and incorporates by reference, provisional application Ser. No. 60/613,521, filed Sep. 27, 2004, and entitled "USB Storage Device Security."

BACKGROUND

Some computer systems permit access to a removable storage device. For example, many computers contain universal serial bus (USB) connections to which a USB device can be mated. USB devices include mice, keyboards, digital cameras, as well as storage devices. The user simply plugs the USB device into the corresponding USB connector on the computer and the computer provides access to the device. A security issue arises as the USB device can be used to copy data from the computer as well as to load viruses and other malicious data onto the computer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
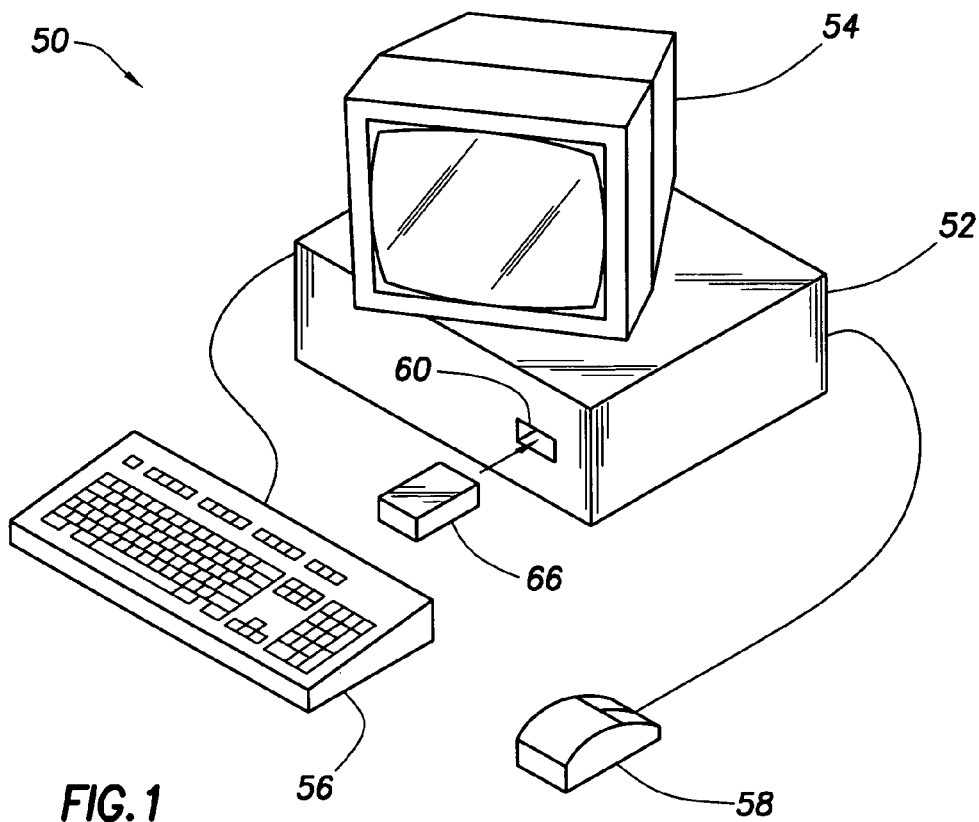
FIG. 1 shows a computer system in accordance with embodiments of the invention.

Referring to FIG. 1, a computer system 50 comprises a computer chassis 52 coupled to a display 54, a keyboard 56, and a mouse 58. The computer also comprises at least one user-accessible connector 60 to which a removable storage medium 66 can be mated. In at least some embodiments, the removable storage medium 66 comprise a storage device such as a universal serial bus (USB) storage device. As a USB storage device, device 66 comprises a non-volatile storage medium such as a Flash memory. The following discussion assumes a USB storage device, but as noted, the removable storage device is not limited to USB devices.

Figure 2:
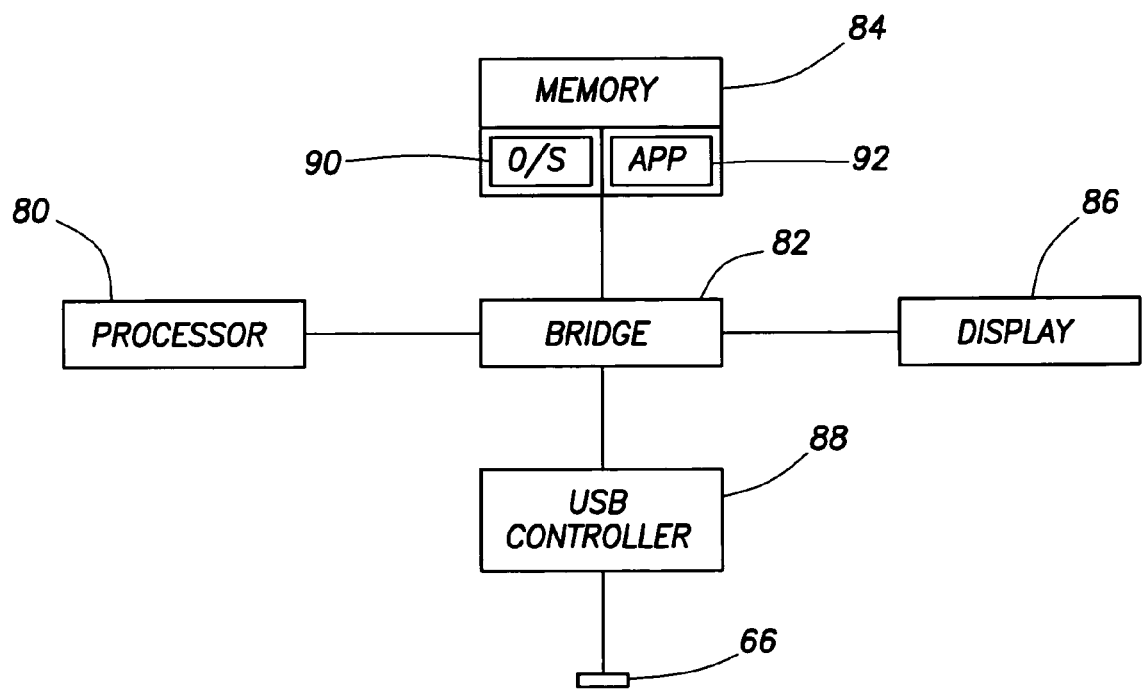
FIG. 2 shows a block diagram of a computer system in accordance with embodiments of the invention.

FIG. 2 shows a functional block diagram of the computer system 50. As shown, the system comprises a processor 80 coupled to a bridge device 82. System memory 84, the display 86, and a USB controller 88 also couple to the bridge device 82. When mated to connector 60, the USB storage device 66 is accessible to the system by way of the USB controller 88.

An operating system 90 is executed by the processor 80. The operating system 90 is stored in non-volatile storage (e.g., a hard drive, not specifically shown) and executed from system memory 84. An application 92 is also shown in memory 84. In general, the application 92 is provided on storage medium (e.g., random access memory, hard drive, CD ROM, etc.) and executed by the processor to cause various actions to be performed as explained below.

The application 92 can be run by a user via, for example, the "Control Panel" provided as part of the Windows operating system. When executed, the application provides the user with a graphical user interface (GUI) on display 54. The GUI permits a user to select a security setting from among a plurality of selectable security settings and that causes the operating system to implement the user-selected security settings to control access to the USB storage device.

Figure 3:
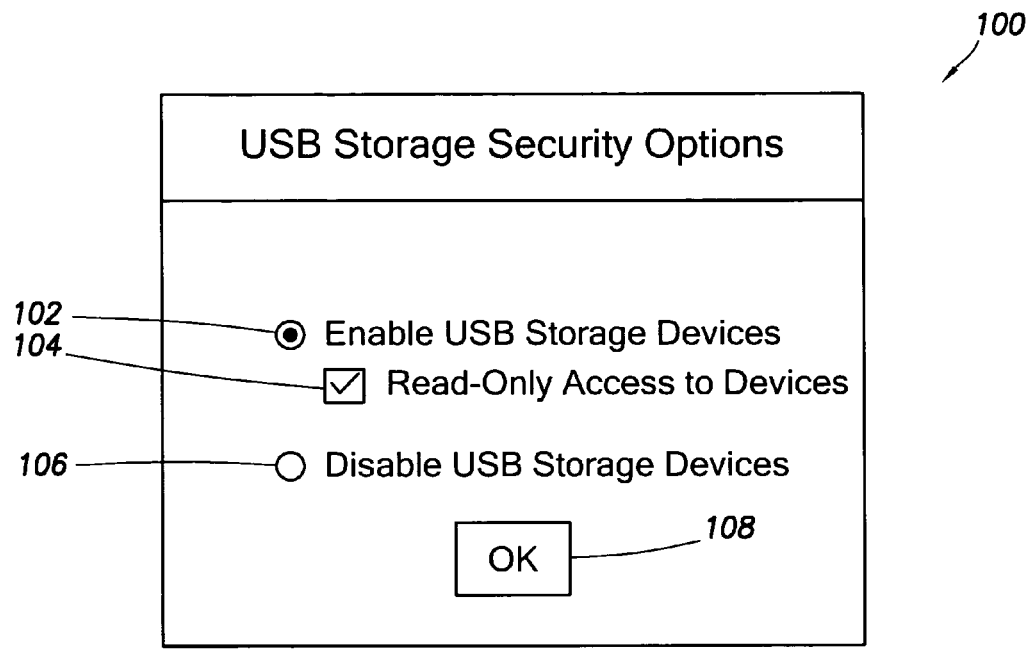
FIG. 3 shows a graphical user interface in accordance with embodiments of the invention.

An exemplary embodiment of a GUI is shown in FIG. 3 as GUI 100. As shown in the embodiment of FIG. 3, GUI 100 comprises three user-selectable security settings 102, 104, and 106. Security setting 102 permits a user to enable access to any USB storage devices that are connected to the system 50. If security setting 102 is selected, which is the case in FIG. 3, security setting 104 is selectable to permit any connected USB storage devices to be accessible in a read-only mode. By enabling read-only access to a USB storage device, data from the computer system 50 cannot be copied to the USB storage device and thus confidential information on the computer system 50 cannot be compromised. Rather than selecting security setting 102 to enable USB storage device access, a user instead can select security setting 106 which disables all access (read and write access) to all USB storage devices that are connected to the system. An "OK" button 108 is also provided in GUI 100 to record the user's chosen security settings.

The application, in conjunction with the security features of the operating, implement the user-selected security settings. The following discussion provides a suitable technique for implementing the aforementioned security settings. The following discussion assumes that a USB driver (e.g., a USBSTOR driver or functional equivalent) is installed on the computer system 50. If the "enable USB storage devices" button 102 is selected, the "start type" of the USBSTOR driver is set to "manual" by changing the [HKEY_LOCAL_MACHINE\SYSTEM\CurrentControlSet\Services\usbstor] value to 0x00000003. If the read-only option is selected (setting 104), the following Registry value will be set: [HKEY_LOCAL_MACHINE\System\Current ControlSet\Control\StorageDevicePolicies] "WriteProtect"=0x00000001

If, however, the disable option is selected (setting 106), the start type of he USBSTOR driver is set to "disabled" by setting the "Start"=0x0000000n (where n =3 or 4 [enabled or disabled, respectively]) value to 0x00000004.

Figure 4:
FIG. 4 shows an error message in accordance with embodiments of the invention.

It is possible that a user will run application 92 and select the "disable USB storage devices" setting 106 while a USB storage device is already connected to the system 50. In this situation, the application 92 causes an error message to be shown on display 54. The error message informs the user that a removable storage device services is currently running on the system and that all removable storage devices must be removed from the system. An example of such an error message is shown in FIG. 4 as a pop-up window.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor;
a display;
an operating system executable on said processor, said operating system providing settings usable to control access to a removable storage medium; and
an executable application, separate from said operating system, said application provides a graphical user interface (GUI) on the display that permits a user to select a security setting from among a plurality of selectable security settings and that causes the operating system to implement said user-selected security settings to control access to the removable storage medium by configuring a start type for a driver associated with the removable storage medium;
wherein the plurality of selectable security settings comprise graphical images that enable access to the removable storage medium, make the removable storage medium whose access is enabled read-only, and disable access to the removable storage medium;
wherein the executable application causes an error message indicative of and to be displayed when, while the removable storage medium is mated to said system, a user selects the graphical image to disable access to the removable storage medium; and
wherein the error message informs the user that a removable storage medium service is currently running on the system and that all removable storage media must be removed from the system.

2. The system of claim 1 wherein the removable storage medium comprises a universal serial bus (USB) storage device.

3. The system of claim 1 wherein the executable application does not disable access to the removable storage medium if the removable storage medium is mated to said system when a user selects the graphical image to disable access to the removable storage medium.

4. A storage medium containing software separate from an operating system and that, when executed by a processor, causes the processor to:
provide a graphical user interface to a user, said graphical user interface comprises graphical images that enable access to a removable storage medium, make the removable storage medium whose access is enabled read-only, and disable access to the removable storage medium; and
control access to the removable storage medium in accordance with a selection by the user of the graphical images;
wherein the software causes an error message to indicate that, and to be displayed when, while the removable storage medium is mated to a computer, a user selects the graphical image to disable access to the removable storage device; and
wherein the error message informs the user that a removable storage device service is currently running on the computer and that all removable storage media must be removed from the system.

5. The storage medium of claim 4 wherein the software does not disable access to the removable storage device if a removable storage device is mated to said computer when a user selects the graphical image to disable access to removable storage devices.

6. A method, comprising:
providing a graphical user interface (GUI) comprising graphical images that enable access to a removable storage medium, make the removable storage medium whose access is enabled read-only, and disable access to the removable storage medium;
controlling access to the removable storage medium in accordance with a selected graphical image by configuring a start type for a driver associated with the removable storage medium; and
displaying an error message that indicates that, while the removable storage medium is mated to a computer, a user has selected the graphical to disable access to the removable storage medium;
wherein the error message informs the user that a removable storage medium service is currently running on the computer and that all removable storage media must be removed from the system.

7. The method of claim 6 wherein the removable storage device comprises a universal serial bus (USB) storage device.

8. The method of claim 6 wherein controlling access to the removable storage medium comprises interacting with security features of an operating system to implement the selection that was made.

9. A system, comprising:
means for providing a graphical user interface (GUI) to receive an input selection of one of a plurality of graphical images from a user as to a security control of a removable storage device;
means for controlling access to the removable storage device in accordance with the user-provided security control by configuring a start type for a driver associated with the removable storage device;
wherein said graphical images comprise a first graphical image by which a user enables access to the removable storage device, a second graphical image by which the user makes the removable storage device, if enabled, read-only, and a third graphical image by which a user disables access to the removable storage device; and
means for displaying an error message that indicates that, while the removable storage device is mated to a computer, a user has selected the graphical to disable access to the removable storage device;
wherein the error message informs the user that a removable storage medium service is currently running on the computer and that all removable storage devices must be removed from the system.

* * * * *